Feb. 1, 1949.   R. E. HEROLD   2,460,635
FITTING
Filed June 27, 1946   2 Sheets-Sheet 1

INVENTOR.
ROBERT E. HEROLD
BY Richey & Watts
ATTORNEYS

Feb. 1, 1949.  R. E. HEROLD  2,460,635
FITTING

Filed June 27, 1946  2 Sheets-Sheet 2

INVENTOR.
ROBERT E. HEROLD
BY Richey & Watts
ATTORNEYS

Patented Feb. 1, 1949

2,460,635

UNITED STATES PATENT OFFICE 2,460,635

FITTING

Robert E. Herold, Cleveland, Ohio, assignor to The Weatherhead Company, Cleveland, Ohio, a corporation of Ohio Application June 27, 1946, Serial No. 679,750

5 Claims. (Cl. 285—122)

This invention relates to fittings, more particularly to the type of fitting wherein a metal sleeve is deformed about a tube to assist in retaining the tube in a fitting body.

The prior art discloses fittings of the general type to which this invention relates in which a metal sleeve having a cutting edge is wedged against a tapered surface of the fitting body by a pressure of the fitting nut and, as the nut is tightened, the tapered surface of the body causes the cutting edge of the metal sleeve to cut into and shear up material of the tube, forming a mechanically strong leak-proof joint. In work subjected to vibration and pulsating pressures some difficulty has been experienced with the fittings of the prior art in that if care were not taken when initially setting up the nut, the cutting edge of the metal sleeve would cut too deeply into the tube, thus weakening it and making it subject to fracture. It is an object of this invention to prevent serious weakening of the tube by the cutting edge of the ring by providing the ring with a relatively blunt cutting edge which has a novel action in that as it cuts into the tube its cutting edge is turned somewhat and the front edge of the ring soon becomes an abutment surface which prevents further cutting into the tube.

Another difficulty encountered with the sleeve of fittings of this general type in the prior art is that due to the shape of the forward cutting edge the sleeves were not reversible and since these sleeves are relatively small it is not uncommon for inexperienced personnel to assemble them in reverse position. It is another object of this invention to make it impossible to incorrectly assemble the sleeve by designing a novel cutting edge such that it can also be engaged by the nut thereby making the sleeve reversible.

Sleeves of the type to which this invention relates formerly required a recessing operation at the cutting edge which is relatively expensive and which is somewhat difficult when the parts are small. It is a further object of the present invention to simplify and cheapen the manufacturing cost of the sleeve by designing a novel cutting portion which eliminates the necessity for an undercut or recessed end.

It is a further object of this invention to insure that the point of application of radial deforming pressure against the working end of the ring coincides radially with the cutting edge, thereby increasing the effectiveness of the translation of setting up pressure into cutting force.

These and other objects will become apparent as the following detailed description of my invention proceeds.

Figure 1:
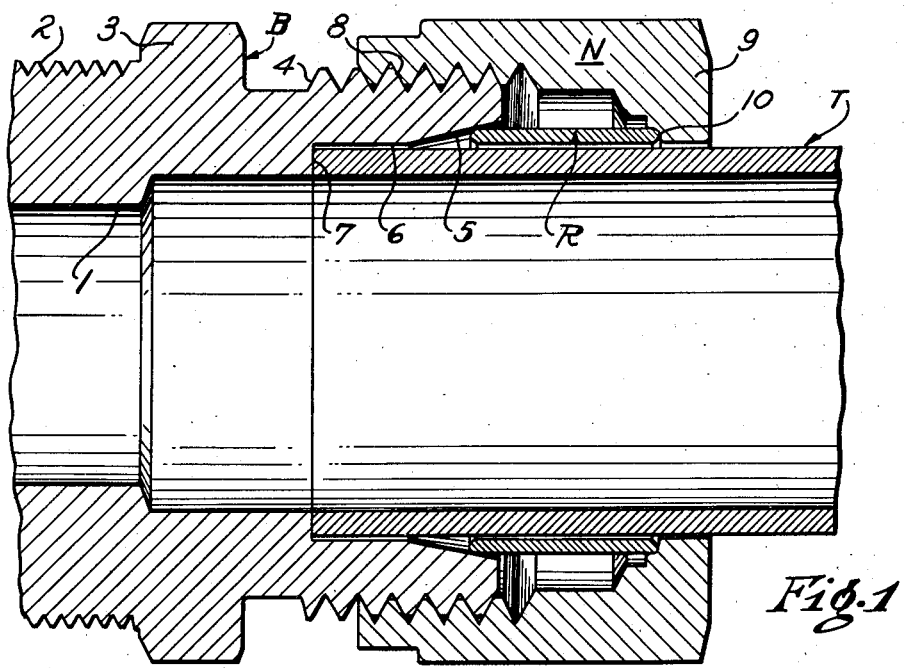
Fig. 1 is a section through the fitting before it is tightened.

The parts of the fitting as shown in Fig. 1 are the body B, the nut N, and the cutting ring R, the fitting being tightened to grip and seal with the tube T. Body B has a fluid conducting bore 1 and one end of it has threads or other means 2 to fasten to a mating part. A wrench portion 3 and threads 4 are also provided on the body B. An inner wall 5 is formed in the body for clamping the ring about the tube and a counterbore 6 terminates in a shoulder 7 against which the end of the tube T is forced during the tightening of the fitting. The nut N has threads 8 and a wrench-receiving portion 9 as well as an annular seat 10 for the other end of the ring R.

Figure 2:
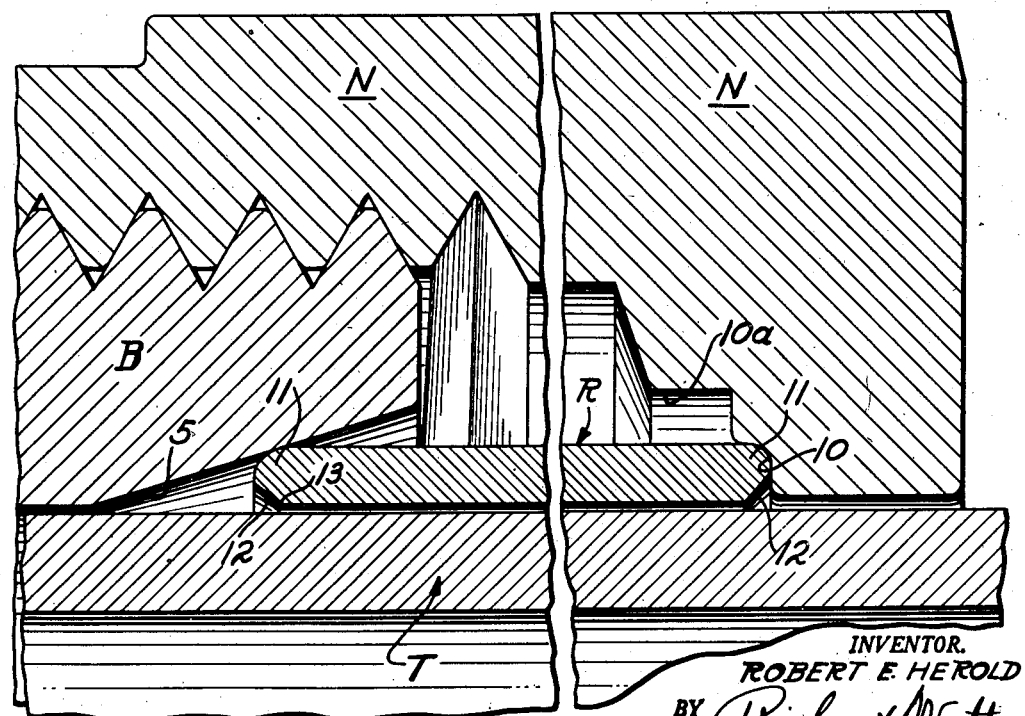
Fig. 2 is an enlarged section through the fitting at the sleeve before it is tightened, showing the engagements at both ends of the sleeve.

In Fig. 2 it can be seen that the ring R has a curved nose portion 11 at each end and it is conical or undercut as at 12 to form a relatively blunt cutting edge 13. The annular seat 10 in the nut is preferably shaped to conform to the shape of the curved nose portion 11 of the ring. A bore 10a is provided in the nut to provide clearance for the ring in case it buckles slightly during the tightening operation. This insures that all setting up pressure will be transmitted to the forward part of the ring.

Figure 3:
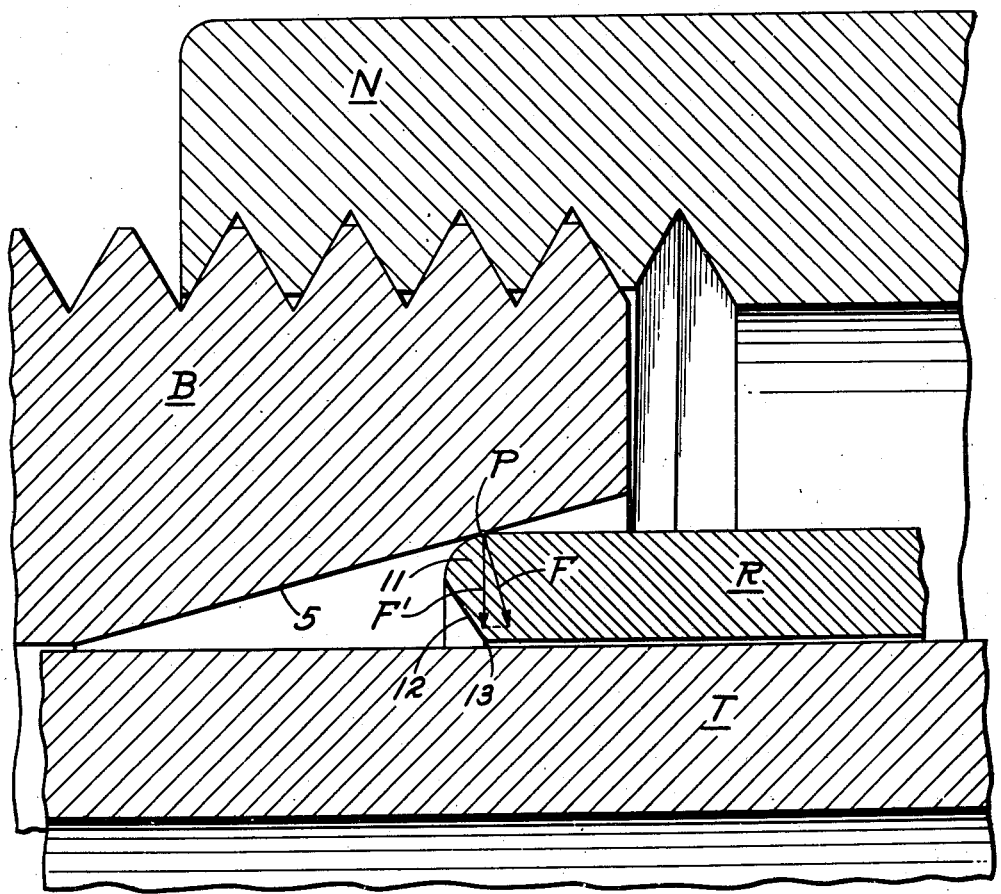
Fig. 3 is a still further enlarged section of the cutting end of the sleeve showing the forces resulting from tightening the nut.

Fig. 3 shows the forces which act as tightening begins. The nose portion of the ring R engages the tapered wall 5 at point P. The tapered wall 5, in response to axial pressure caused by the nut, exerts a force F on the ring which is perpendicular to the wall 5. This force F has a radial component F' perpendicular to the ring axis which is the effective force tending to deform the ring against the tube. It will be noted that I have designed the undercut or tapered face 12 so that the cutting edge 13 falls in the region of the extension of the bending force F'. This is an important feature of my invention in that the deforming pressure upon the ring is transmitted directly to the cutting edge which provides a very effective means of getting relatively high pressure upon the working edge of the ring without requiring an excessive torque to set up the nut.

Figure 4:
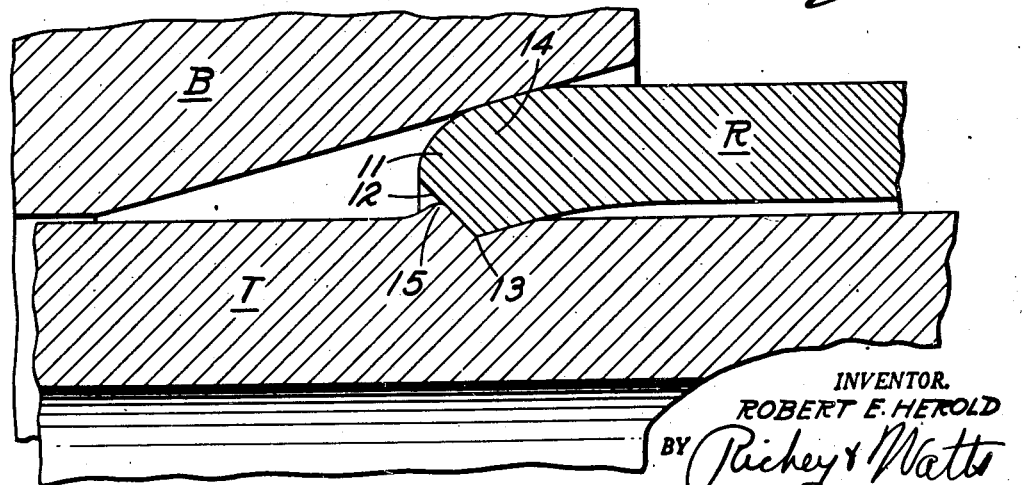
Fig. 4 is a section like Fig. 3 after the nut has been tightened.

In Fig. 4 the nut has been tightened and when this happens the end of the ring tends to turn or curl over as at 14 and the ring also moves along axially, the total result being that the cutting edge 13 and the tapered face 12 cut into the tube and shear up some of the metal as shown at 15 to provide a mechanically strong fluid-tight joint. As the tightening action increases it can be seen that due to the curling or bending at the end of the ring the entry angle of the cutting edge becomes greater and greater tending to reduce the cutting action. Simultaneously, the tapered face 12 acts like an abutment so that the combination of these two actions tends to prevent any further cutting into the tube after a certain point in the tightening operation has been reached. It is this safety feature which reduces danger of fracture of the tube under vibration and impulse loadings by insuring that the cutting into the tube by a sharp edge cannot become too severe. Of course, during the tightening operation the other end of the ring pivots about the seat 10 in the nut, this seat having been illustrated in Fig. 2. In this manner all the force of the nut is transmitted directly to the cutting edge because there is nothing to restrict the ring as it tends to buckle and produce the action shown in Fig. 4. I have found that one angle between the tapered face 12 and the axis of the ring which produces satisfactory results is an angle about 120° but this is not a critical figure, it is merely given for purposes of illustration and I contemplate that variations in such angle may be made without departing from the spirit of the invention as defined in the claims.

I have found that this type of cutting ring is particularly successful on stainless steel which material being tough and strong tends to destroy the sharpness of the cutting edge in the more conventional type of fittings. The cutting edge in my novel fitting is well backed up by ample material and will effectively function when working with stainless steel. It can be seen that the shape of ring herein shown is not only effective and easy to use but can be readily manufactured without delicate undercutting or machining operations. I have found that I can stamp the ring, roll the ring into shape or, of course, the end portions 11 and 12 could be machined. In either case the absence of counterboring or undercutting the ring reduces its cost.

Having provided a detailed description of my invention, I contemplate that this description is for illustrative purposes only and that various modifications may be made by those skilled in the art without departing from the spirit of my invention as defined in the appended claims.

Having thus described the present invention so that others skilled in the art may be able to understand and practice the same, I state that what I desire to secure by Letters Patent is defined in what is claimed.

What I claim is:

1. In a fitting for metallic tubing, a fitting body having an internal tapered wall and an abutment wall for the end of a tube, a nut threaded to said body and having an internal shoulder, and a continuous tube cutting and gripping ring, one end of said ring engaging said nut shoulder, said ring having a tube cutting edge formed by the intersection of a substantially cylindrical inner wall of the ring and a conical ring edge surface which forms an obtuse angle with said inner wall, said cutting edge cutting and shearing up metal of the tube when the nut is tightened and motion of said ring axially along said tapered body wall causing the forward portion of the ring to turn radially inwardly so that its conical edge acts as an abutment against the tube metal tending to prevent excessive cutting and shearing of said tube material.

2. In a fitting for metallic tubing, a fitting body having an internal tapered wall and an abutment wall for the end of a tube, a nut threaded to said body and having an internal shoulder, and a continuous tube cutting and gripping ring, one end of said ring engaging said nut shoulder with a pivotal engagement, said ring having a tube cutting edge formed by the intersection of a substantially cylindrical inner wall of the ring and a conical ring edge surface which forms an obtuse angle with said inner wall, said ring also having a rounded nose portion merging with said conical edge, said rounded nose portion engaging the tapered body wall at a point in substantial radial alignment with the cutting edge of said ring, said cutting edge cutting and shearing up metal of the tube when the nut is tightened and motion of said ring axially along said tapered body wall causing the forward portion of the ring to bend radially inwardly so that its conical edge acts as an abutment against the tube metal tending to prevent excessive cutting and shearing up of said tube material, said ring being radially unobstructed except at its ends.

3. A continuous tube cutting and gripping ring, said ring having a tube cutting edge formed by the intersection of a substantially cylindrical inner wall of the ring and a conical ring edge surface which forms an obtuse angle with said inner wall, said ring also having a rounded nose portion merging with said conical edge, said rounded nose portion arranged to engage a fitting body wall at a point in substantial radial alignment with the cutting edge of said ring, said cutting edge arranged for cutting and shearing up metal of the tube.

4. In a tube coupling, the combination of a tube fitting body wall, a tube cutting and gripping ring having an annular tube cutting edge formed by the intersection of a substantially cylindrical inner wall of the ring and a conical ring end surface which forms an obtuse angle with the said cylindrical inner wall, inter-engaging wedging surfaces, one formed at the cutting end of the ring and the other formed by said fitting body wall, one of which surfaces is curved, and means to force the two interengaging surfaces together by moving one axially toward the other.

5. As an article of manufacture, a continuous tube cutting and gripping ring for a fitting, one end of said ring having a tube cutting edge formed by the intersection of a substantially cylindrical inner wall of the ring and a conical edge surface that forms an obtuse angle with said cylindrical inner wall, said one end of the ring also having a nose portion disposed radially outwardly of said conical edge, said nose portion being of increasing diameter in a direction away from said one end of the ring and arranged to engage a fitting body wall at a point in substantial radial alignment with the cutting edge of said ring when said one end of the ring is curled over and cutting into a tube.

ROBERT E. HEROLD.

REFERENCES CITED

The following references are of record in the file of this patent:

UNITED STATES PATENTS

| Number | Name | Date |
|---|---|---|
| 2,230,116 | Kreidel | Jan. 28, 1941 |